United States Patent
Sweeney et al.

(10) Patent No.: US 10,557,056 B2
(45) Date of Patent: Feb. 11, 2020

(54) ABS/POLYCARBONATE/POLY(STYRENE-CO-MALEIMIDE) PART MATERIAL FOR ELECTROPHOTOGRAPHY-BASED ADDITIVE MANUFACTURING

(71) Applicant: Evolve Additive Solutions, Inc., Minnetonka, MN (US)

(72) Inventors: Maura A. Sweeney, Irondequoit, NY (US); Mark E. Mang, Rochester, NY (US); Susan LaFica, Fairport, NY (US)

(73) Assignee: Evolve Additive Solutions, Inc., Minnetonka, MN (US)

( * ) Notice: Subject to any disclaimer, the term of this patent is extended or adjusted under 35 U.S.C. 154(b) by 459 days.

(21) Appl. No.: 15/392,479

(22) Filed: Dec. 28, 2016

(65) Prior Publication Data
US 2017/0190114 A1   Jul. 6, 2017

Related U.S. Application Data

(60) Provisional application No. 62/273,684, filed on Dec. 31, 2015.

(51) Int. Cl.
| | |
|---|---|
| *B29C 67/00* | (2017.01) |
| *B33Y 50/02* | (2015.01) |
| *B33Y 10/00* | (2015.01) |
| *B33Y 70/00* | (2015.01) |
| *C09D 125/08* | (2006.01) |
| *C09D 135/06* | (2006.01) |
| *C09D 151/00* | (2006.01) |
| *C09D 169/00* | (2006.01) |

(Continued)

(52) U.S. Cl.
CPC .......... *C09D 135/06* (2013.01); *B29C 64/141* (2017.08); *B29C 64/40* (2017.08); *B33Y 10/00* (2014.12); *B33Y 70/00* (2014.12); *C08L 55/02* (2013.01); *C09D 151/00* (2013.01); *G03G 15/1625* (2013.01); *G03G 15/224* (2013.01); *G03G 15/24* (2013.01); *B29K 2025/08* (2013.01); *B29K 2055/02* (2013.01); *B29K 2069/00* (2013.01); *G03G 2215/1695* (2013.01)

(58) Field of Classification Search
CPC ................ C09D 135/06; C09D 151/00; G03G 2215/1695; G03G 15/24; G03G 15/224; G03G 15/1625; B29C 64/141; B29C 64/40; C08L 55/02
See application file for complete search history.

(56) References Cited

U.S. PATENT DOCUMENTS

| | | |
|---|---|---|
| 8,123,999 B2 | 2/2012 | Priedeman, Jr. et al. |
| 8,246,888 B2 | 8/2012 | Hopkins et al. |

(Continued)

*Primary Examiner* — Robert J Grun
(74) *Attorney, Agent, or Firm* — Pauly, DeVries Smith & Deffner LLC

(57) ABSTRACT

A part material for printing three-dimensional parts with an electrophotography-based additive manufacturing system, the part material including a composition having a grafted copolymer (including acrylonitrile units, butadiene units, aromatic units modified with polycarbonate and poly(styrene-co-maleimide)), a charge control agent, and a heat absorber. The part material is provided in a powder form having a controlled particle size, and is configured for use in the electrophotography-based additive manufacturing system having a layer transfusion assembly for printing the three-dimensional parts in a layer-by-layer manner.

15 Claims, 9 Drawing Sheets

(51) Int. Cl.

| | |
|---|---|
| *C08L 55/02* | (2006.01) |
| *B29C 64/40* | (2017.01) |
| *G03G 15/16* | (2006.01) |
| *G03G 15/24* | (2006.01) |
| *G03G 15/22* | (2006.01) |
| *B29C 64/141* | (2017.01) |
| *B29K 55/02* | (2006.01) |
| *B29K 69/00* | (2006.01) |
| *B29K 25/00* | (2006.01) |

(56) References Cited

U.S. PATENT DOCUMENTS

| | | |
|---|---|---|
| 8,459,280 B2 | 6/2013 | Swanson et al. |
| 2008/0169585 A1 | 7/2008 | Zinniel |
| 2011/0186081 A1 | 8/2011 | Dunn et al. |
| 2013/0077996 A1 | 3/2013 | Hanson et al. |
| 2013/0077997 A1 | 3/2013 | Hanson et al. |
| 2013/0186549 A1 | 7/2013 | Comb et al. |
| 2013/0186558 A1 | 7/2013 | Comb et al. |

ABS/POLYCARBONATE/POLY(STYRENE-CO-MALEIMIDE) PART MATERIAL FOR ELECTROPHOTOGRAPHY-BASED ADDITIVE MANUFACTURING

CROSS REFERENCE TO RELATED APPLICATION(S)

The present application claims the benefit of U.S. Provisional Patent Application Ser. No. 62/273,684 entitled AB S/POLYCAROBONATE/POLY(STYRENE-CO-MALEIMIDE) PART MATERIAL FOR ELECTROPHOTOGRAPHY-BASED ADDITIVE MANUFACTURING which was filed on Dec. 31, 2015, the contents of which are incorporated by reference in its entirety.

BACKGROUND

The present disclosure relates to additive manufacturing systems for printing three-dimensional (3D) parts and support structures. In particular, the present disclosure relates to consumable materials for printing 3D parts and support structures using an imaging process, such as electrophotography.

Additive manufacturing is generally a process for manufacturing a three-dimensional (3D) object an additive manner utilizing a computer model of the objects The basic operation of an additive manufacturing system consists of slicing a three-dimensional computer model into thin cross sections, translating the result into position data, and the position data to control equipment which manufacture a three-dimensional structure in a layerwise manner using one or more additive manufacturing techniques. Additive manufacturing entails many different approaches to the method of fabrication, including fused deposition modeling, ink jetting, selective laser sintering, powder/binder jetting, electron-beam melting, electrophotographic imaging, and stereolithographic processes.

In fabricating 3D parts by depositing layers of a part material, supporting layers or structures are typically built underneath overhanging portions or in cavities of objects under construction, which are not supported by the part material itself. A support structure may be built utilizing the same deposition techniques by which the part material is deposited. The host computer generates additional geometry acting as a support structure for the overhanging or free-space segments of the 3D part being formed, and in some cases, for the sidewalls of the 3D part being formed. The support material adheres to the part material during fabrication, and is removable from the completed 3D part when the printing process is complete.

In an electrophotographic 3D printing process, slices of the digital representation of the 3D part and its support structure are printed or developed using an electrophotographic engine. The electrophotographic engine generally operates in accordance with 2D electrophotographic printing processes, using charged powder materials that are formulated for use in building a 3D part (e.g., a polymeric toner material). The electrophotographic engine typically uses a support drum that is coated with a photoconductive material layer, where latent electrostatic images are formed by electrostatic charging following image-wise exposure of the photoconductive layer by an optical source. The latent electrostatic images are then moved to a developing station where the polymeric toner is applied to charged areas, or alternatively to discharged areas of the photoconductive insulator to form the layer of the charged powder material representing a slice of the 3D part. The developed layer is transferred to a transfer medium, from which the layer is transfused to previously printed layers with heat and pressure to build the 3D part.

SUMMARY

An aspect of the present disclosure is directed to a part material for printing 3D parts with an electrophotography-based additive manufacturing system. The part material has a composition that includes a copolymer comprising acrylonitrile units, butadiene units, aromatic units, modified with polycarbonate and poly(styrene-co-maleimide), a charge control agent, and a heat absorber. The part material is provided in a powder form having a controlled particle size (e.g., a D50 particle size ranging from about 5 micrometers to about 50 micrometers), with a particle size distribution (GSD) volume of 1.35 or less and preferably 1.30 or less. The part material and is configured for use in the electrophotography-based additive manufacturing system having a layer transfusion assembly for printing the 3D parts in a layer-by-layer manner. This material also has a selected triboelectric charge region from +/−1 µC/g to +/−100 µC/g that enables specific development in the electrophotographic/electrostatographic system. This charge up can be done in a two component carrier-based system or a single component system based upon a charging roller.

Another aspect of the present disclosure is directed to a part material for printing 3D parts with an electrophotography-based additive manufacturing system, where the part material has a composition that includes an acrylonitrile-butadiene-styrene (ABS) copolymer modified with polycarbonate and poly(styrene-co-maleimide), a charge control agent, and a heat absorber. The part material is provided in a powder form having a controlled particle size and a narrow particle size distribution, and is configured for use in the electrophotography-based additive manufacturing system having a layer transfusion assembly for printing the three-dimensional parts in a layer-by-layer manner.

Another aspect of the present disclosure is directed to a method for printing a 3D part with an electrophotography-based additive manufacturing system having an electrophotography engine, a transfer medium, and a layer transfusion assembly. The method includes providing a part material to the electrophotography-based additive manufacturing system, where the part material compositionally includes a charge control agent, a heat absorber, and a copolymer having acrylonitrile units, butadiene units, aromatic units modified with polycarbonate and poly(styrene-co-maleimide), and has a powder form.

DEFINITIONS

Unless otherwise specified, the following terms as used herein have the meanings provided below:

The term "copolymer" refers to a polymer having two or more monomer species.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the inventive scope of the present disclosure.

Reference to "a" chemical compound refers one or more molecules of the chemical compound, rather than being limited to a single molecule of the chemical compound. Furthermore, the one or more molecules may or may not be identical, so long as they fall under the category of the chemical compound. Thus, for example, "an" ABS grafted copolymer is interpreted to include one or more polymer molecules of the ABS grafted copolymer, where the polymer molecules may or may not be identical (e.g., different molecular weights and/or isomers). To further elaborate, the butadiene is polymerized in an emulsion polymerization and the styrene acrylonitrile is afterwards polymerized by continuous mass polymerization in the presence of the polybutadiene.

The terms "at least one" and "one or more of" an element are used interchangeably, and have the same meaning that includes a single element and a plurality of the elements, and may also be represented by the suffix "(s)" at the end of the element. For example, "at least one ABS copolymer", "one or more ABS copolymers", and "ABS copolymer(s)" may be used interchangeably and have the same meaning.

Directional orientations such as "above", "below", "top", "bottom", and the like are made with reference to a direction along a printing axis of a 3D part. In the embodiments in which the printing axis is a vertical z-axis, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, the terms "above", "below", "top", "bottom", and the like are relative to the given axis.

The term "providing", such as for "providing a material" and the like, when recited in the claims, is not intended to require any particular delivery or receipt of the provided item. Rather, the term "providing" is merely used to recite items that will be referred to in subsequent elements of the claim(s), for purposes of clarity and ease of readability.

Unless otherwise specified, temperatures referred to herein are based on atmospheric pressure (i.e. one atmosphere).

The terms "about" and "substantially" are used herein with respect to measurable values and ranges due to expected variations known to those skilled in the art (e.g., limitations and variabilities in measurements).

DETAILED DESCRIPTION

The present disclosure is directed to consumable materials, such as part and support materials, which are engineered for use in an electrophotography-based additive manufacturing system to print 3D parts and support structures with high resolutions and fast printing rates. During a printing operation, electrophotography (EP) engines may develop or otherwise image each layer of the part and support materials using the electrophotographic process. The developed layers are then transferred to a layer transfusion assembly where they are transfused (e.g., using heat and/or pressure) to print one or more 3D parts and support structures in a layer-by-layer manner.

In comparison to 2D printing, in which developed toner particles can be electrostatically transferred to printing paper by placing an electrical potential through the printing paper, the multiple printed layers in a 3D environment effectively prevents the electrostatic transfer of part and support materials after a given number of layers are printed (e.g., about 15 layers). Instead, each layer may be heated to an elevated transfer temperature, and then pressed against a previously-printed layer (or to a build platform) to transfuse the layers together in a transfusion step. This allows numerous layers of 3D parts and support structures to be built vertically, beyond what is otherwise achievable via electrostatic transfers.

As discussed below, the part material is a powder-based grafted co-polymer of acrylonitrile-butadiene-styrene (ABS) that is modified with polycarbonate and poly(styrene-co-maleimide). The part material can include a charge control agent (e.g., an internal triboelectric charge control agent), preferably a heat absorber (e.g., an infrared absorber), and may optionally include one or more additional materials, such as a flow control agent, which may also function as an external surface-treatment triboelectric charge control agent and/or a triboelectric modification additive. The part material is engineered for use with electrophotography-based additive manufacturing systems to print 3D parts having high part resolutions and good physical properties including improved mechanical elongation relative to part material that is not modified with polycarbonate and poly(styrene-co-maleimide). This allows the resulting 3D parts to function as end-use parts, if desired.

Figure 1:
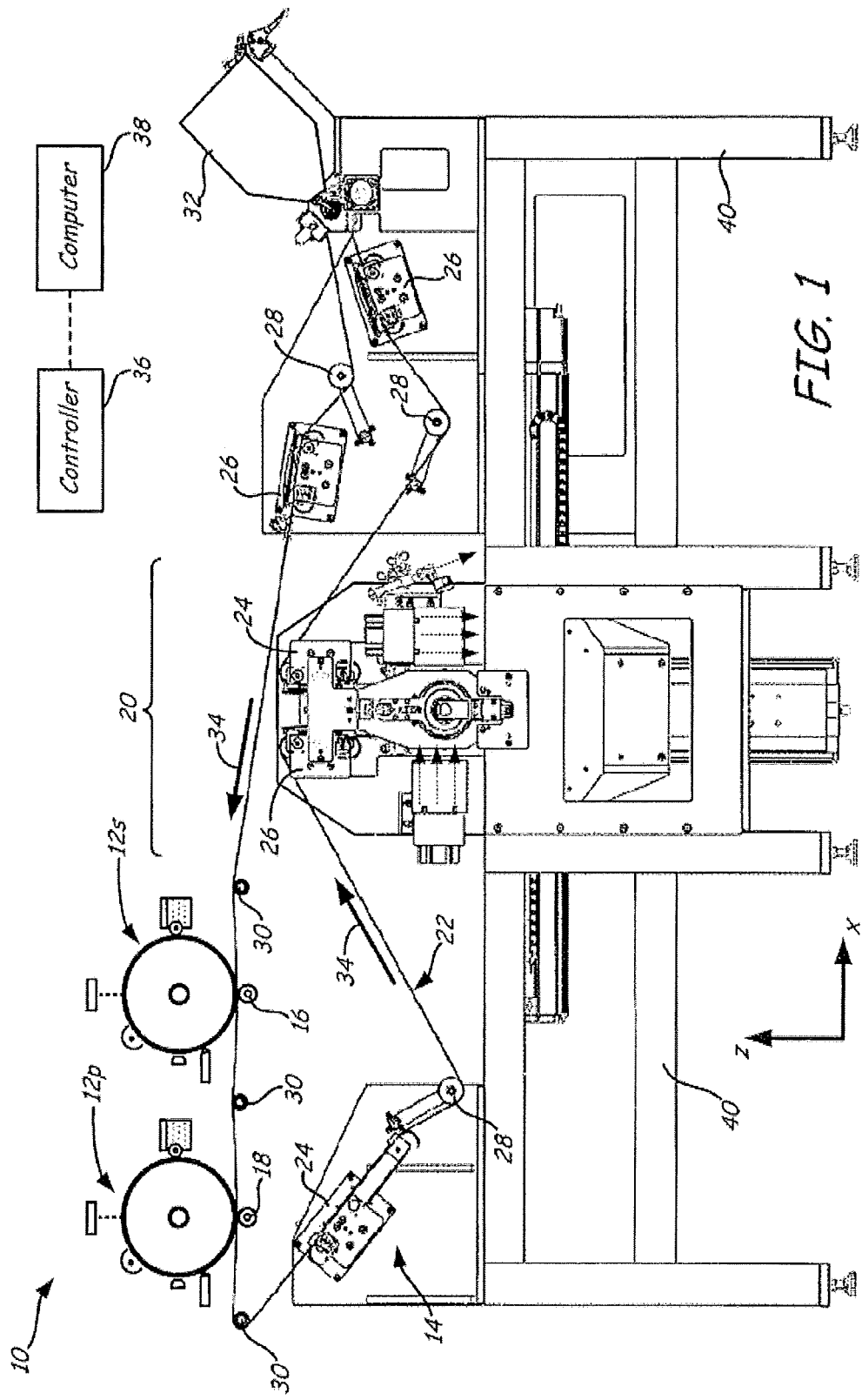
FIG. 1 is a front view of an example electrophotography-based additive manufacturing system for printing 3D parts and support structures from part and support materials of the present disclosure.

FIGS. 1-4 illustrate system 10, which is an example of electrophotography-based additive manufacturing system for printing 3D parts from the part material of the present disclosure, and associated support structures from a sacrificial support material. As shown in FIG. 1, system 10 includes a pair of EP engines 12p and 12s, belt transfer assembly 14, biasing mechanisms 16 and 18, and layer transfusion assembly 20. Examples of suitable components and functional operations for system 10 include those disclosed in Hanson et al., U.S. Publication Nos. 2013/0077996 and 2013/0077997, and in Comb et al., U.S. Patent Application Nos. 2013/0186549 and 2013/0186558.

EP engines 12p and 12s are imaging engines for respectively imaging or otherwise developing layers of the part and support materials, where the part and support materials are each preferably engineered for use with the particular architecture of EP engine 12p or 12s. As discussed below, the imaged layers may then be transferred to belt transfer assembly 14 (or other transfer medium) with biasing mechanisms 16 and 18, and carried to layer transfusion assembly 20 to print the 3D parts and associated support structures in a layer-by-layer manner.

In the shown embodiment, belt transfer assembly 14 includes transfer belt 22, belt drive mechanisms 24, belt drag mechanisms 26, loop limit sensors 28, idler rollers 30, and belt cleaner 32, which are configured to maintain tension on belt 22 while belt 22 rotates in the rotational direction of arrows 34. In particular, belt drive mechanisms 24 engage and drive belt 22, and belt drag mechanisms 26 may function as brakes to provide a service loop design for protecting belt 22 against tension stress, based on monitored readings via loop limit sensors 28.

System 10 also includes controller 36, which is one or more control circuits, microprocessor-based engine control systems, and/or digitally-controlled raster imaging processor systems, and which is configured to operate the components of system 10 in a synchronized manner based on printing instructions received from host computer 38. Host computer 38 is one or more computer-based systems configured to communicate with controller 36 to provide the print instructions (and other operating information). For example, host computer 38 may transfer information to controller 36 that relates to the sliced layers of the 3D parts and support structures, thereby allowing system 10 to print the 3D parts and support structures in a layer-by-layer manner.

The components of system 10 may be retained by one or more frame structures, such as frame 40. Additionally, the components of system 10 are preferably retained within an enclosable housing (not shown) that prevents ambient light from being transmitted to the components of system 10 during operation.

Figure 2:
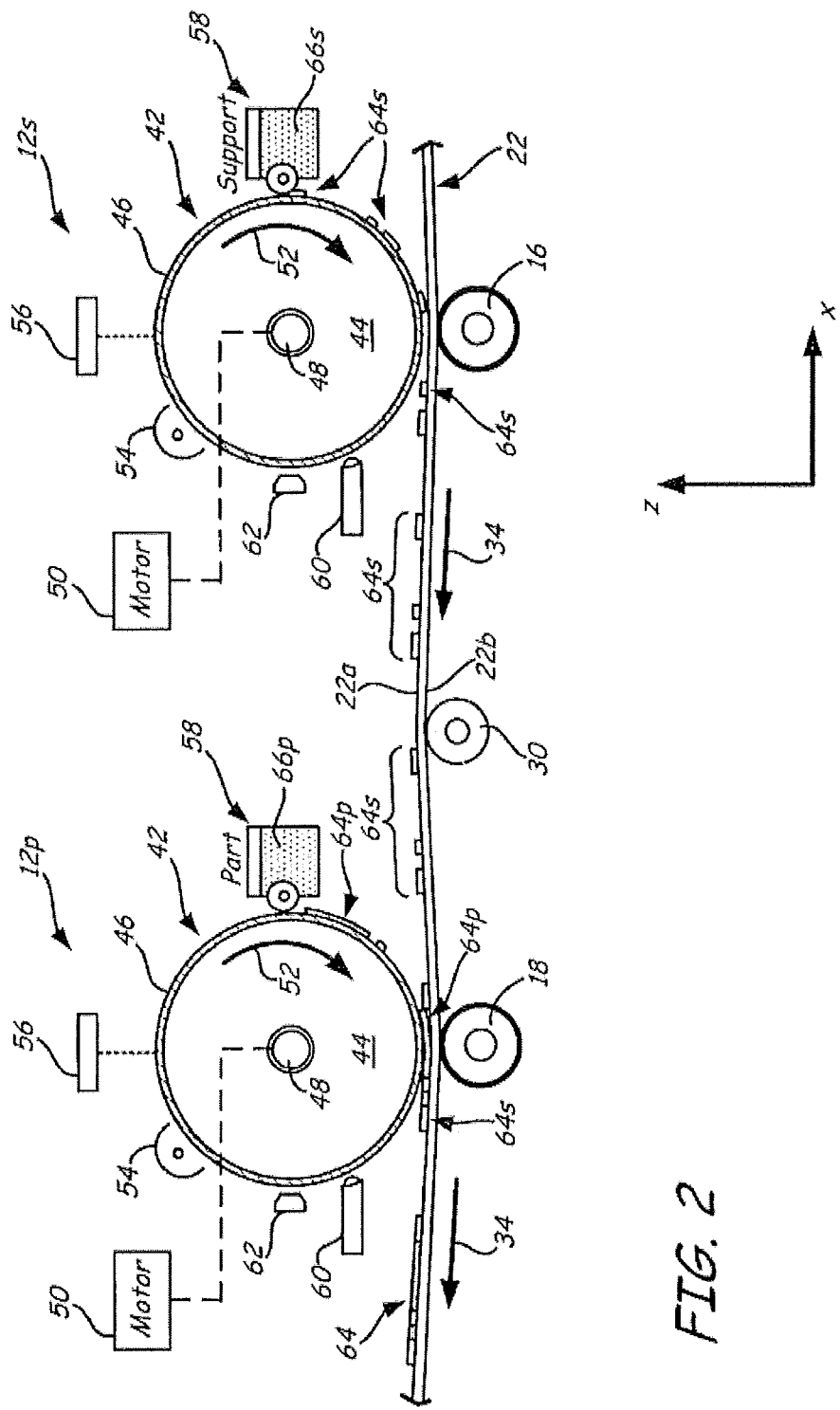
FIG. 2 is a schematic front view of a pair of electrophotography engines of the system for developing layers of the part and support materials.

FIG. 2 illustrates EP engines 12p and 12s, where EP engine 12s (i.e., the upstream EP engine relative to the rotational direction of belt 22) develops layers of the support material, and EP engine 12p (i.e., the downstream EP engine relative to the rotational direction of belt 22) develops layers of the part material. In alternative embodiments, the arrangement of EP engines 12p and 12s may be reversed such that EP engine 12p is upstream from EP engine 12s relative to the rotational direction of belt 22. In further alternative embodiments, system 10 may include three or more EP engines for printing layers of additional materials.

In the shown embodiment, EP engines 12p and 12s may include the same components, such as photoconductor drum 42 having conductive drum body 44 and photoconductive surface 46. Conductive drum body 44 is an electrically-conductive drum (e.g., fabricated from copper, aluminum, tin, or the like) that is electrically grounded and configured to rotate around shaft 48. Shaft 48 is correspondingly connected to drive motor 50, which is configured to rotate shaft 48 (and photoconductor drum 42) in the direction of arrow 52 at a constant rate.

Photoconductive surface 46 is a thin film extending around the circumferential surface of conductive drum body 44, and is preferably derived from one or more photoconductive materials, such as amorphous silicon, selenium, zinc oxide, organic materials, and the like. As discussed below, surface 46 is configured to receive latent-charged images of the sliced layers of a 3D part or support structure (or negative images), and to attract charged particles of the part or support material of the present disclosure to the charged or discharged image areas, thereby creating the layers of the 3D part or support structure.

As further shown, EP engines 12p and 12s also includes charge inducer 54, imager 56, development station 58, cleaning station 60, and discharge device 62, each of which may be in signal communication with controller 36. Charge inducer 54, imager 56, development station 58, cleaning station 60, and discharge device 62 accordingly define an image-forming assembly for surface 46 while drive motor 50 and shaft 48 rotate photoconductor drum 42 in the direction of arrow 52.

In the shown example, the image-forming assembly for surface 46 of EP engine 12s is used to form layers 64s of the support material (referred to as support material 66s), where a supply of support material 66s may be retained by development station 58 (of EP engine 12s) along with carrier particles. Similarly, the image-forming assembly for surface 46 of EP engine 12p is used to form layers 64p of the part material (referred to as part material 66p), where a supply of part material 66p may be retained by development station 58 (of EP engine 12p) along with carrier particles.

Charge inducer 54 is configured to generate a uniform electrostatic charge on surface 46 as surface 46 rotates in the direction of arrow 52 past charge inducer 54. Suitable devices for charge inducer 54 include corotrons, scorotrons, charging rollers, and other electrostatic charging devices.

Imager 56 is a digitally-controlled, pixel-wise light exposure apparatus configured to selectively emit electromagnetic radiation toward the uniform electrostatic charge on surface 46 as surface 46 rotates in the direction of arrow 52 past imager 56. The selective exposure of the electromagnetic radiation to surface 46 is directed by controller 36, and causes discrete pixel-wise locations of the electrostatic charge to be removed (i.e., discharged to ground), thereby forming latent image charge patterns on surface 46.

Suitable devices for imager 56 include scanning laser (e.g., gas or solid state lasers) light sources, light emitting diode (LED) array exposure devices, and other exposure device conventionally used in 2D electrophotography systems. In alternative embodiments, suitable devices for charge inducer 54 and imager 56 include ion-deposition systems configured to selectively directly deposit charged ions or electrons to surface 46 to form the latent image charge pattern. As such, as used herein, the term "electrophotography" includes ionography.

Each development station 58 is an electrostatic and magnetic development station or cartridge that retains the supply of part material 66p or support material 66s, preferably in powder form, along with carrier particles. Development stations 58 may function in a similar manner to single or dual component development systems and toner cartridges used in 2D electrophotography systems. For example, each development station 58 may include an enclosure for retaining the part material 66p or support material 66s and carrier particles. When agitated, the carrier particles generate triboelectric charges to attract the powders of the part material 66p or support material 66s, which charges the attracted powders to a selected sign and magnitude, as discussed below.

Each development station 58 may also include one or more devices for transferring the charged part material 66p or support material 66s to surface 46, such as conveyors, fur brushes, paddle wheels, rollers, and/or magnetic brushes. For instance, as surface 46 (containing the latent charged image) rotates from imager 56 to development station 58 in the direction of arrow 52, the charged part material 66p or support material 66s is attracted to the appropriately charged regions of the latent image on surface 46, utilizing either charged area development or discharged area development (depending on the electrophotography mode being utilized). This creates successive layers 64p or 64s as photoconductor drum 12 continues to rotate in the direction of arrow 52, where the successive layers 64p or 64s correspond to the successive sliced layers of the digital representation of the 3D part or support structure.

The successive layers 64p or 64s are then rotated with surface 46 in the direction of arrow 52 to a transfer region in which layers 64p or 64s are successively transferred from photoconductor drum 42 to belt 22, as discussed below. While illustrated as a direct engagement between photoconductor drum 42 and belt 22, in some preferred embodiments, EP engines 12p and 12s may also include intermediary transfer drums and/or belts, as discussed further below. After a given layer 64p or 64s is transferred from photoconductor drum 42 to belt 22 (or an intermediary transfer drum or belt), drive motor 50 and shaft 48 continue to rotate photoconductor drum 42 in the direction of arrow 52 such that the region of surface 46 that previously held the layer 64p or 64s passes cleaning station 60. Cleaning station 60 is a station configured to remove any residual, non-transferred portions of part or support material 66p or 66s. Suitable devices for cleaning station 60 include blade cleaners, brush cleaners, electrostatic cleaners, vacuum-based cleaners, and combinations thereof.

After passing cleaning station 60, surface 46 continues to rotate in the direction of arrow 52 such that the cleaned regions of surface 46 pass discharge device 62 to remove any residual electrostatic charge on surface 46, prior to starting the next cycle. Suitable devices for discharge device 62 include optical systems, high-voltage alternating-current corotrons and/or scorotrons, one or more rotating dielectric rollers having conductive cores with applied high-voltage alternating-current, and combinations thereof.

Transfer belt 22 is a transfer medium for transferring the developed successive layers 64p and 64s from photoconductor drum 42 (or an intermediary transfer drum or belt) to layer transfusion assembly 16. Examples of suitable transfer belts for belt 22 include those disclosed in Comb et al., U.S. Patent Application Nos. 2013/0186549 and 2013/0186558. Belt 22 includes front surface 22a and rear surface 22b, where front surface 22a faces surface 46 of photoconductor drums 42 and rear surface 22b is in contact with biasing mechanisms 16 and 18.

Biasing mechanisms 16 and 18 are configured to induce electrical potentials through belt 22 to electrostatically attract layers 64p and 64s from EP engines 12p and 12s to belt 22. Because layers 64p and 64s are each only a single layer increment in thickness at this point in the process, electrostatic attraction is suitable for transferring layers 64p and 64s from EP engines 12p and 12s to belt 22.

Controller 36 preferably rotates photoconductor drums 36 of EP engines 12p and 12s at the same rotational rates that are synchronized with the line speed of belt 22 and/or with any intermediary transfer drums or belts. This allows system 10 to develop and transfer layers 64p and 66s in coordination with each other from separate developer images. In particular, as shown, each part layer 64p may be transferred to belt 22 with proper registration with each support layer 64s to preferably produce a combined part and support material layer 64. This allows layers 64p and 64s to be transfused together, requiring the part and support materials to have thermal properties and melt rheologies that are similar or substantially the same. As can be appreciated, some layers transferred to layer transfusion assembly 20 may only include support material 66s or may only include part material 66p, depending on the particular support structure and 3D part geometries and layer slicing.

In an alternative embodiment, part layers 64p and support layers 64s may optionally be developed and transferred along belt 22 separately, such as with alternating layers 64p and 64s. These successive, alternating layers 64p and 64s may then be transferred to layer transfusion assembly 20, where they may be transfused separately to print the 3D part and support structure.

Figure 3:
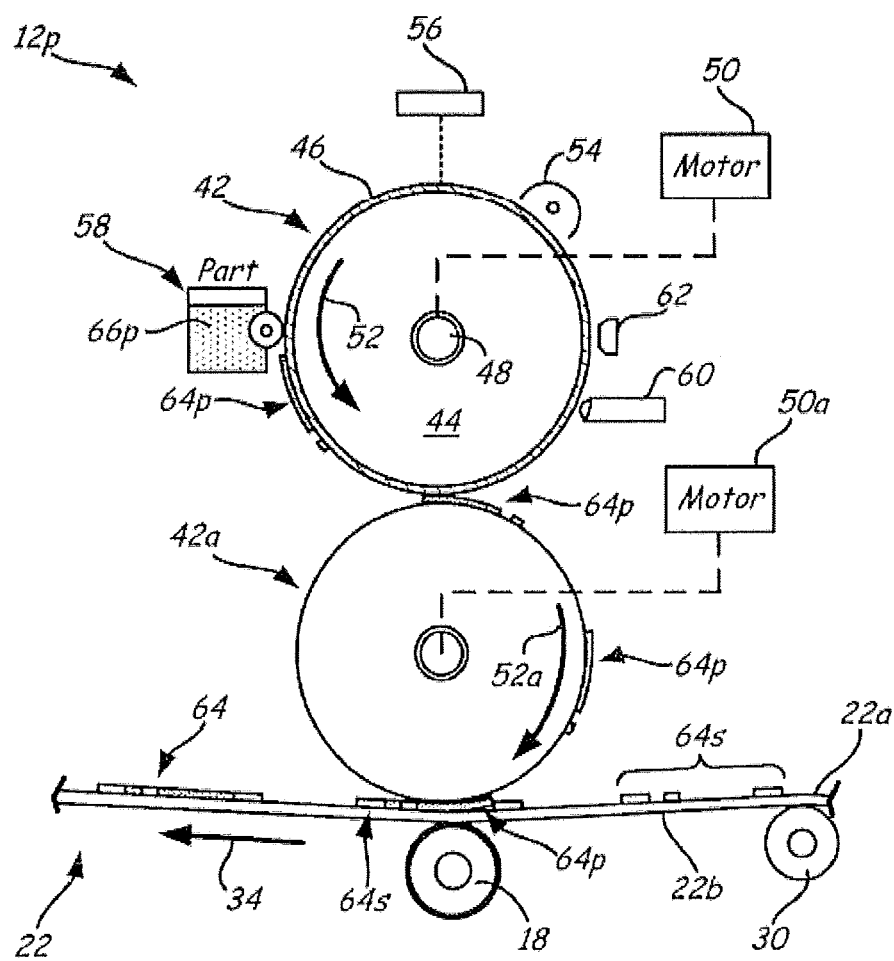
FIG. 3 is a schematic front view of an alternative electrophotography engine, which includes an intermediary drum or belt.

In some embodiments, one or both of EP engines 12p and 12s may also include one or more intermediary transfer drums and/or belts between photoconductor drum 42 and belt 22. For example, as shown in FIG. 3, EP engine 12p may also include intermediary drum 42a that rotates an opposing rotational direction from arrow 52, as illustrated by arrow 52a, under the rotational power of motor 50a. Intermediary drum 42a engages with photoconductor drum 42 to receive the developed layers 64p from photoconductor drum 42, and then carries the received developed layers 64p and transfers them to belt 22.

EP engine 12s may include the same arrangement of intermediary drum 42a for carrying the developed layers 64s from photoconductor drum 42 to belt 22. The use of such intermediary transfer drums or belts for EP engines 12p and 12s can be beneficial for thermally isolating photoconductor drum 42 from belt 22, if desired.

Figure 4:
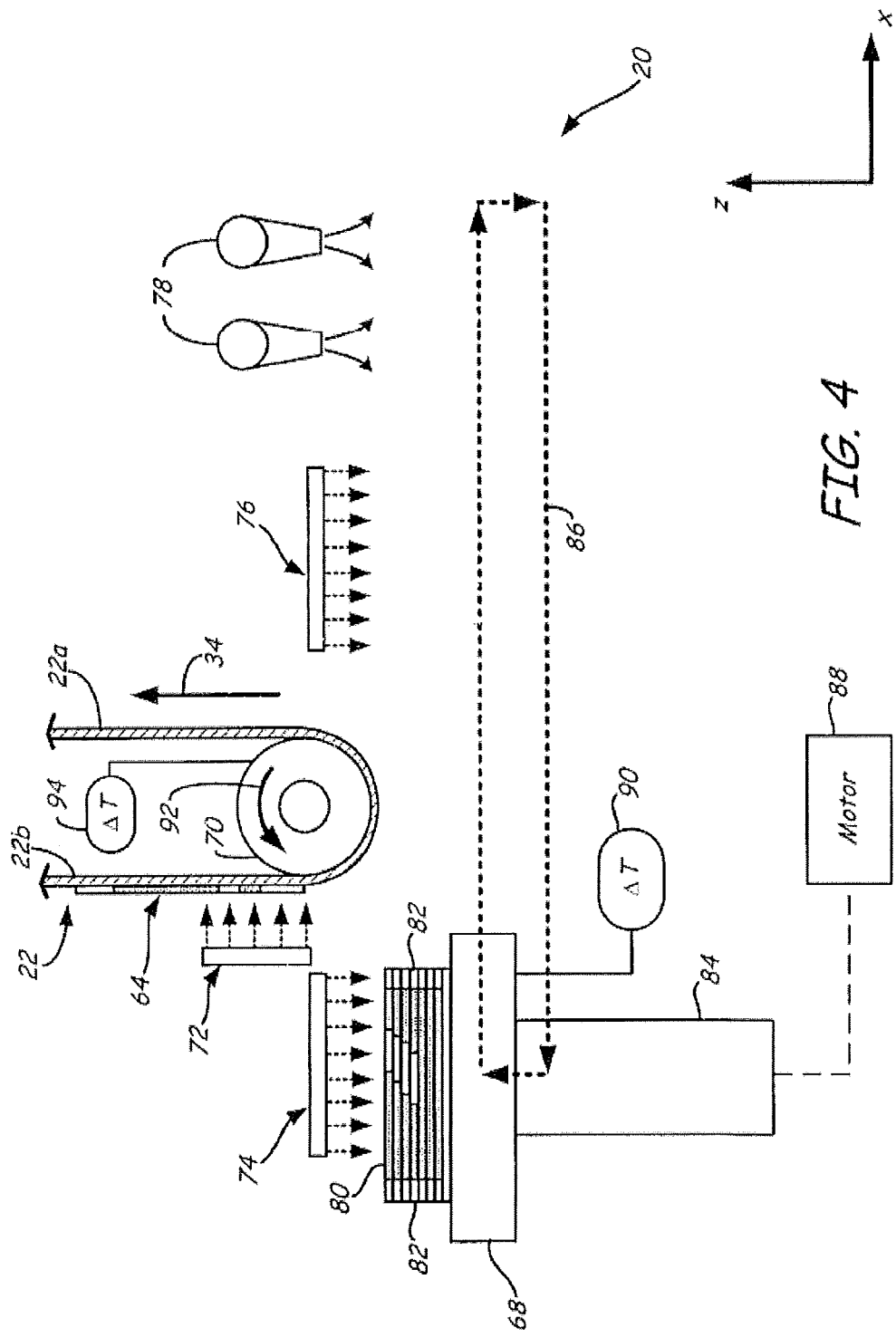
FIG. 4 is a schematic front view of a layer transfusion assembly of the system for performing layer transfusion steps with the developed layers.

FIG. 4 illustrates an example of an embodiment for layer transfusion assembly 20. As shown, layer transfusion assembly 20 includes build platform 68, nip roller 70, heaters 72 and 74, post-fuse heater 76, and air jets 78 (or other cooling units). Build platform 68 is a platform assembly or platen of system 10 that is configured to receive the heated combined layers 64 (or separate layers 64p and 64s) for printing a 3D part and support structure, referred to as 3D part 80 and support structure 82, in a layer-by-layer manner. In some embodiments, build platform 68 may include removable film substrates (not shown) for receiving the printed layers 64, where the removable film substrates may be restrained against build platform using any suitable technique (e.g., vacuum drawing, removable adhesive, mechanical fastener, and the like).

Build platform 68 is supported by gantry 84, which is a gantry mechanism configured to move build platform 68 along the z-axis and the x-axis to produce a reciprocating rectangular pattern, where the primary motion is back-and-forth along the x-axis (illustrated by broken lines 86. Gantry 84 may be operated by motor 88 based on commands from controller 36, where motor 88 may be an electrical motor, a hydraulic system, a pneumatic system, or the like.

In the shown embodiment, build platform 68 is heatable with heating element 90 (e.g., an electric heater). Heating element 90 is configured to heat and maintain build platform 68 at an elevated temperature that is greater than room temperature (25° C.), such as at a selected average part temperature of 3D part 80 and/or support structure 82, as discussed in Comb et al., U.S. Patent Application Nos. 2013/0186549 and 2013/0186558. This allows build platform 68 to assist in maintaining 3D part 80 and/or support structure 82 at this average part temperature.

Nip roller 70 is an example of a heatable element or heatable layer transfusion element, which is configured to rotate around a fixed axis with the movement of belt 22. In particular, nip roller 70 may roll against rear surface 22b in the direction of arrow 92 while belt 22 rotates in the direction of arrow 34. In the shown embodiment, nip roller 70 is heatable with heating element 94 (e.g., an electric heater). Heating element 94 is configured to heat and maintain nip roller 70 at an elevated temperature that is greater than room temperature (25° C.), such as at a selected transfer temperature for layers 64.

Heater 72 is one or more heating devices (e.g., an infrared heater and/or a heated air jet) configured to heat layers 64 to a temperature near an intended transfer temperature of the part and support materials, such as at least a fusion temperature of the part and support materials, preferably prior to reaching nip roller 70. Each layer 64 desirably passes by (or through) heater 72 for a sufficient residence time to heat the layer 64 to the intended transfer temperature. Heater 74 may function in the same manner as heater 72, and heats the top surfaces of 3D part 80 and support structure 82 to an elevated temperature, such as at the same transfer temperature as the heated layers 64 (or other suitable elevated temperature).

As mentioned above, the support material 66s used to print support structure 82 preferably has thermal properties (e.g., glass transition temperature) and a melt rheology that are similar to or substantially the same as the thermal properties and the melt rheology of the part material 66p used to print 3D part 80. This allows part and support materials of layers 64p and 64s to be heated together with heater 74 to substantially the same transfer temperature, and also allows the part and support materials at the top surfaces of 3D part 80 and support structure 82 to be heated together with heater 74 to substantially the same temperature. Thus, the part layers 64p and the support layers 64s may be transfused together to the top surfaces of 3D part 80 and support structure 82 in a single transfusion step as combined layer 64. This single transfusion step for transfusing the combined layer 64 is not believed to be feasible without matching the thermal properties and the melt rheologies of the part and support materials.

Post-fuse heater 76 is located downstream from nip roller 70 and upstream from air jets 78, and is configured to heat the transfused layers to an elevated temperature in the post-fuse or heat-setting step. Again, the similar thermal properties and melt rheologies of the part and support materials allow post-fuse heater 76 to post-heat the top surfaces of 3D part 80 and support structure 82 together in a single post-fuse step.

Prior to printing 3D part 80 and support structure 82, build platform 68 and nip roller 70 may be heated to their selected temperatures. For example, build platform 68 may be heated to the average part temperature of 3D part 80 and support structure 82 (due to the close melt rheologies of the part and support materials). In comparison, nip roller 70 may be heated to a selected transfer temperature for layers 64 (also due to the similar thermal properties and melt rheologies of the part and support materials).

During the printing operation, belt 22 carries a layer 64 past heater 72, which may heat the layer 64 and the associated region of belt 22 to the transfer temperature. Suitable transfer temperatures for the part and support materials include temperatures that exceed the glass transition temperatures of the part and support materials, which are preferably similar or substantially the same, and where the part and support materials of layer 64 are softened but not melted (e.g., a temperature of ranging from about 140° C. to about 180° C. for the part material).

As further shown in FIG. 4, during operation, gantry 84 may move build platform 68 (with 3D part 80 and support structure 82) in a reciprocating rectangular pattern 86. In particular, gantry 84 may move build platform 68 along the x-axis below, along, or through heater 74. Heater 74 heats the top surfaces of 3D part 80 and support structure 82 to an elevated temperature, such as the transfer temperatures of the part and support materials. As discussed in Comb et al., U.S. Patent Publication Nos. 2013/0186549 and 2013/0186558, heaters 72 and 74 may heat layers 64 and the top surfaces of 3D part 80 and support structure 82 to about the same temperatures to provide a consistent transfusion interface temperature. Alternatively, heaters 72 and 74 may heat layers 64 and the top surfaces of 3D part 80 and support structure 82 to different temperatures to attain a selected transfusion interface temperature.

The continued rotation of belt 22 and the movement of build platform 68 align the heated layer 64 with the heated top surfaces of 3D part 80 and support structure 82 with proper registration along the x-axis. Gantry 84 may continue to move build platform 68 along the x-axis, at a rate that is synchronized with the rotational rate of belt 22 in the direction of arrow 34 (i.e., the same directions and speed). This causes rear surface 22b of belt 22 to rotate around nip roller 70 to nip belt 22 and the heated layer 64 against the top surfaces of 3D part 80 and support structure 82. This presses the heated layer 64 between the heated top surfaces of 3D part 80 and support structure 82 at the location of nip roller 70, which at least partially transfuses heated layer 64 to the top layers of 3D part 80 and support structure 82.

As the transfused layer 64 passes the nip of nip roller 70, belt 22 wraps around nip roller 70 to separate and disengage from build platform 68. This assists in releasing the transfused layer 64 from belt 22, allowing the transfused layer 64 to remain adhered to 3D part 80 and support structure 82. Maintaining the transfusion interface temperature at a transfer temperature that is higher than the glass transition temperatures of the part and support materials, but lower than their fusion temperatures, allows the heated layer 64 to be hot enough to adhere to 3D part 80 and support structure 82, while also being cool enough to readily release from belt 22. Additionally, as discussed above, the similar thermal properties and melt rheologies of the part and support materials allow them to be transfused in the same step.

After release, gantry 84 continues to move build platform 68 along the x-axis to post-fuse heater 76. At post-fuse heater 76, the top-most layers of 3D part 80 and support structure 82 (including the transfused layer 64) may then be heated to at least the fusion temperature of the part and support materials in a post-fuse or heat-setting step. This melts the part and support materials of the transfused layer 64 to a highly fusable state such that polymer molecules of the transfused layer 64 quickly interdiffuse to achieve a high level of interfacial entanglement with 3D part 80 and support structure 82.

Additionally, as gantry 84 continues to move build platform 68 along the x-axis past post-fuse heater 76 to air jets 78, air jets 78 blow cooling air towards the top layers of 3D part 80 and support structure 82. This actively cools the transfused layer 64 down to the average part temperature, as discussed in Comb et al., U.S. Patent Application Nos. 2013/0186549 and 2013/0186558, which are incorporated by reference in their entireties.

To assist in keeping 3D part 80 and support structure 82 at the average part temperature, in some preferred embodiments, heater 74 and/or post-heater 76 may operate to heat only the top-most layers of 3D part 80 and support structure 82. For example, in embodiments in which heaters 72, 74, and 76 are configured to emit infrared radiation, 3D part 80 and support structure 82 may include heat absorbers and/or other colorants configured to restrict penetration of the infrared wavelengths to within the top-most layers. Alternatively, heaters 72, 74, and 76 may be configured to blow heated air across the top surfaces of 3D part 80 and support structure 82. In either case, limiting the thermal penetration into 3D part 80 and support structure 82 allows the top-most layers to be sufficiently transfused, while also reducing the amount of cooling required to keep 3D part 80 and support structure 82 at the average part temperature.

Gantry 84 may then actuate build platform 68 downward, and move build platform 68 back along the x-axis to a starting position along the x-axis, following the reciprocating rectangular pattern 86. Build platform 68 desirably reaches the starting position for proper registration with the next layer 64. In some embodiments, gantry 84 may also actuate build platform 68 and 3D part 80/support structure 82 upward for proper registration with the next layer 64. The same process may then be repeated for each remaining layer 64 of 3D part 80 and support structure 82.

In some preferred embodiments, a resulting 3D part 80 is encased laterally (i.e., horizontally to the build plane) in the support structure 82, such as shown in FIG. 4. This is believed to provide good dimensional integrity and surface quality for the 3D part 80 while using a reciprocating build platen 68 and a nip roller 70.

After the printing operation is completed, the resulting 3D part 80 and support structure 82 may be removed from system 10 and undergo one or more post-printing operations. For example, support structure 82 derived from the support material of the present disclosure may be sacrificially removed from 3D part 80, such as by using an aqueous-based solution (e.g., an aqueous alkali solution). For instance, an example of a preferred support material for use with the Part material includes a soluble support material. Using a soluble technique, support structure 82 may at least partially dissolve or disintegrate in an aqueous solution or dispersion, separating it from 3D part 80.

In comparison, part materials such as the part material are chemically resistant to aqueous alkali solutions. This allows the use of an aqueous alkali solution to be employed for removing the sacrificial support structure 82 without degrading the shape or quality of 3D part 80. Examples of suitable systems and techniques for removing support structure 82 in this manner include those disclosed in Swanson et al., U.S. Pat. No. 8,459,280; Hopkins et al., U.S. Pat. No. 8,246,888; and Dunn et al., U.S. Publication No. 2011/0186081; each of which are incorporated by reference to the extent that they do not conflict with the present disclosure.

Furthermore, after support structure 82 is removed, 3D part 80 may undergo one or more additional post-printing processes, such as surface treatment processes. Examples of suitable surface treatment processes include those disclosed in Priedeman et al., U.S. Pat. No. 8,123,999; and in Zinniel, U.S. Publication No. 2008/0169585.

As briefly discussed above, the part material compositionally includes an acrylonitrile-butadiene-styrene (ABS) grafted copolymer that is modified with polycarbonate and poly(styrene-co-maleimide), a charge control agent, preferably a heat absorber (e.g., an infrared absorber), and optionally one or more additional materials, such as a flow control agent. As mentioned above, the part material is preferably engineered for use with the particular architecture of EP engine 12*p*.

The ABS copolymer is polymerized from monomers that preferably include acrylonitrile, butadiene, and an aromatic monomer such as styrene. Example acrylonitrile monomers have the following structure:

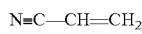     (Formula 1)

where, in some embodiments, the hydrogen atoms in Formula 1 may be independently substituted with one or more optional low-atomic weight groups, such as an alkyl or ether group having 1-3 carbon atoms. Furthermore, in some embodiments, the ethylenically-unsaturated group and the cyano group may be separated by an optional chain linkage, such as a hydrocarbon or ether linkage having 1-8 carbon atoms. More preferably, the acrylonitrile monomer includes the structure shown above in Formula 1, with the ethylenically-unsaturated vinyl group extending directly from the cyano group.

Example butadiene monomers have the following structure:

     (Formula 2)

where, in some embodiments, the hydrogen atoms in Formula 2 may be independently substituted with one or more optional low-atomic weight groups, such as an alkyl or ether group having 1-3 carbon atoms. Furthermore, in some embodiments, the pair of ethylenically-unsaturated groups may be separated by an optional chain linkage, such as a hydrocarbon or ether linkage having 1-8 carbon atoms. More preferably, the butadiene monomer includes the structure shown above in Formula 2, with the pair of ethylenically-unsaturated vinyl groups extending directly from each other.

Example aromatic monomers have the following structure:

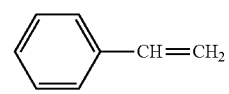     (Formula 3)

where, in some embodiments, the hydrogen atoms in Formula 3 may be independently substituted with one or more optional low-atomic weight groups, such as an alkyl or ether group having 1-3 carbon atoms. Furthermore, in some embodiments, the ethylenically-unsaturated group and the aromatic group may be separated by an optional chain linkage, such as a hydrocarbon or ether linkage having 1-8 carbon atoms. In some further embodiments, one or more hydrogen atoms of the aromatic group may be independently substituted with one or more optional low-atomic weight groups, such as an alkyl or ether group having 1-3 carbon atoms. More preferably, the aromatic monomer includes the structure shown above in Formula 3, with the ethylenically-unsaturated vinyl group extending directly from the aromatic group (i.e., styrene).

The styrene acrylonitrile (SAN) and polycarbonate monomers may be polymerized with a continuous mass free-radical polymerization reaction using any suitable free-radical initiator. The butadiene monomers may be initially polymerized by emulsion polymerization to produce submicron monodisperse polybutadiene. The SAN/Polycarbonate can be combined with a styrene-co-malemide to better enhance the strength and heat resistance of the polymer. Nitrile groups of neighboring chains are believed to attract and bind the chains together, providing good strength for the resulting ABS grafted copolymer. The ABS grafted copolymer may exist as an amorphous two-phase system having a continuous phase of the polymerized styrene acrylonitrile/styrene-co-malemide, and a dispersed phase of the polybutadiene that is dispersed or otherwise distributed in the continuous phase.

The acrylonitrile monomers used to produce the ABS grafted copolymer may constitute from about 10% to about 45% by weight, and more preferably from about 15% to about 35% by weight, based on an entire weight of monomers used to produce the ABS grafted copolymer. The butadiene monomers may constitute from about 1% to about 50% by weight, and more preferably from about 5% to about 35% by weight, based on the entire weight of the monomers used to produce the ABS grafted copolymer. Similarly, the aromatic monomers (e.g., styrene) may constitute from about 30% to about 75% by weight, and more preferably from about 40% to about 60% by weight, based on the entire weight of the monomers used to produce the part material.

The ABS grafted copolymer is modified with polycarbonate and poly(styrene-co-maleimide). The polycarbonate may constitute between about 0.1% by weight to about 25% by weight and the poly(styrene-co-maleimide) may constitute between about 0.1% by weight to about 25% by weight, based on the entire weight of the monomers used to produce the part material.

As mentioned above, the part material is engineered for use in an EP-based additive manufacturing system (e.g., system 10) to print 3D parts (e.g., 3D part 80). As such, the part material may also include one or more materials to assist in developing layers with EP engine 12p, to assist in transferring the developed layers from EP engine 12p to layer transfusion assembly 20, and to assist in transfusing the developed layers with layer transfusion assembly 20.

For example, in the electrophotographic process with system 10, the part material is preferably charged triboelectrically through the mechanism of frictional contact charging with carrier particles at development station 58. This charging of the part material may be referred to by its triboelectric charge-to-mass (Q/M) ratio, which may be a positive or negative charge and has a selected magnitude. The Q/M ratio is inversely proportional to the powder density of the part material, which can be referred to by its mass per unit area (M/A) value. For a given applied development field, as the value of Q/M ratio of the part material is increased from a given value, the M/A value of the part material decreases, and vice versa. Thus, the powder density for each developed layer of the part material is a function of the Q/M ratio of the part material.

It has been found that, in order to provide successful and reliable development of the part material onto development drum 44 and transfer to layer transfusion assembly 20 (e.g., via belt 22), and to print 3D part 80 with a good material density, the part material preferably has a suitable Q/M ratio for the particular architecture of EP engine 12p and belt 22. Examples of preferred Q/M ratios for the part material range from about −1 micro-Coulombs/gram (μC/g) to about −50 μC/g, more preferably from about −10 μC/g to about −40 μC/g, and even more preferably from about −15 μC/g to about −35 μC/g, and even more preferably from about −25 μC/g to about −30 μC/g. While discussed as a negative charge, the part material can have the same magnitude of a positive charge.

Furthermore, if a consistent material density of 3D part 80 is desired, a selected Q/M ratio (and corresponding M/A value) is preferably maintained at a stable level during an entire printing operation with system 10, development station 58 of EP engine 12p may need to be replenished with additional amounts of the part material. This can present an issue because, when introducing additional amounts of the part material to development station 58 for replenishment purposes, the part material is initially in an uncharged state until mixing with the carrier particles. As such, the part material also preferably charges to the selected Q/M ratio at a rapid rate to maintain a continuous printing operation with system 10.

Accordingly, controlling and maintaining the Q/M ratio during initiation of the printing operation, and throughout the duration of the printing operation, will control the resultant rate and consistency of the M/A value of the part material. In order to reproducibly and stably achieve the selected Q/M ratio, and hence the selected M/A value, over extended printing operations, the part material preferably includes one or more charge control agents, which may be added to the ABS grafted copolymer during the manufacturing process of the part material. One example of a charge control agent is zinc t-butylsalicylate.

The charge control agents preferably constitute from about 0.1% by weight to about 5% by weight of the part material, more preferably from about 0.5% by weight to about 4% by weight, and even more preferably from about 0.75% by weight to about 1.5% by weight, based on the entire weight of the part material. In an example of an embodiment, about 1 weight % zinc t-butylsalicylate is added to the part material based upon the total weight of the part material.

In many situations, system 10 prints layers 64p with a substantially consistent material density over the duration of the printing operations. Having a part material with a controlled and consistent Q/M ratio allows this to be achieved. However, in some situations, it may be desirable to adjust the material density between the various layers 64p in the same printing operation. For example, system 10 may be operated to run in a grayscale manner with reduced material density, if desired, for one or more portions of 3D part 80.

In addition to incorporating the charge control agents, for efficient operation EP engine 12p, and to ensure fast and efficient triboelectric charging during replenishment of the part material, the mixture of the part material preferably exhibits good powder flow properties. This is preferred because the part material is fed into a development sump (e.g., a hopper) of development station 58 by auger, gravity, or other similar mechanisms, where the part material undergoes mixing and frictional contact charging with the carrier particles.

For example, the part material may constitute from about 1% by weight to about 30% by weight, based on a combined weight of the part material and the carrier particles, more preferably from about 5% to about 20%, and even more preferably from about 5% to about 10%. The carrier particles accordingly constitute the remainder of the combined weight.

The powder flow properties of the part material can be improved or otherwise modified with the use of one or more flow control agents, such as inorganic oxides. Examples of suitable inorganic oxides include hydrophobic fumed inorganic oxides, such as fumed silica, fumed titania, fumed alumina, mixtures thereof, and the like, where the fumed oxides may be rendered hydrophobic by silane and/or siloxane-treatment processes. Examples of commercially available inorganic oxides for use in the part material include those under the tradename "AEROSIL" from Evonik Industries AG, Essen, Germany.

As discussed above, the one or more charge control agents are suitable for charging the ABS copolymer to a selected Q/M ratio for developing layers of the part material at EP engine 12p, and for transferring the developed layers (e.g., layers 64) to layer transfusion assembly 20 (e.g., via belt 22). However, the multiple printed layers in a 3D environment effectively prevents the electrostatic transfer of part material after a given number of layers are printed. Instead, layer transfusion assembly 20 utilizes heat and pressure to transfuse the developed layers together in the transfusion steps.

In particular, heaters 72 and/or 74 may heat layers 64 and the top surfaces of 3D part 80 and support structure 82 to a temperature near an intended transfer temperature of the Part material, such as at least a fusion temperature of the part material, prior to reaching nip roller 70. Similarly, post-fuse heater 76 is located downstream from nip roller 70 and upstream from air jets 78, and is configured to heat the transfused layers to an elevated temperature in the post-fuse or heat-setting step.

Accordingly, the part material may also include one or more heat absorbers configured to increase the rate at which the part material is heated when exposed to heater 72, heater 74, and/or post-heater 76. For example, in embodiments in which heaters 72, 74, and 76 are infrared heaters, the heat absorber(s) used in the part material may be one or more infrared (including near-infrared) wavelength absorbing materials. Absorption of infrared light causes radiationless decay of energy to occur within the particles, which generates heat in the part material.

The heat absorber is preferably soluble or dispersible in the copolymers used for the preparation of the part material with a limited coalescence process, as discussed below. Additionally, the heat absorber also preferably does not interfere with the formation of the ABS copolymer particles, or stabilization of these particles during the manufacturing process. Furthermore, the heat absorber preferably does not interfere with the control of the particle size and particle size distribution of the ABS copolymer particles, or the yield of the ABS copolymer particles during the manufacturing process.

Suitable infrared absorbing materials for use in the part material may vary depending on the selected color of the part material. Examples of suitable infrared absorbing materials include carbon black (which may also function as a black pigment for the part material), as well as various classes of infrared absorbing pigments and dyes, such as those that exhibit absorption in the wavelengths ranging from about 650 nanometers (nm) to about 900 nm, those that exhibit absorption in the wavelengths ranging from about 700 nm to about 1,050 nm, and those that exhibit absorption in the wavelengths ranging from about 800 nm to about 1,200 nm. Examples of these pigments and dyes classes include anthraquinone dyes, polycyanine dyes, metal dithiolene dyes and pigments, tris aminium dyes, tetrakis aminium dyes, mixtures thereof, and the like.

The infrared absorbing materials also preferably do not significantly reinforce or otherwise alter the melt rheologies of the grafted copolymer, such as the zero shear viscosity versus temperature profile of the grafted copolymer. For example, this can be achieved using a non-reinforcing type of carbon black, or a "low structure" type of carbon black, at low concentrations relative to the ABS copolymer.

Accordingly, in embodiments that incorporate heat absorbers, the heat absorbers (e.g., infrared absorbers) preferably constitute from about 0.05% by weight to about 10% by weight of the part material, more preferably from about 0.5% by weight to about 5% by weight, and in some more preferred embodiments, from about 1% by weight to about 3% by weight, based on the entire weight of the part material. In an exemplary embodiment, the part material includes about 2.5% by weight, based on the entire weight of the part material.

For use in electrophotography-based additive manufacturing systems (e.g., system 10), the Part material preferably has a controlled average particle size and a narrow particle size distribution. For example, preferred D50 particles sizes include those up to about 100 micrometers if desired, more preferably from about 10 micrometers to about 50 micrometers, more preferably from about 10 micrometers to about 40 micrometers, and even more preferably from about 10 micrometers to about 30 micrometers.

Additionally, the particle size distributions, as specified by the parameters D90/D50 particle size distributions and D50/D10 particle size distributions, each preferably range from about 1.00 to 1.40, more preferably from about 1.10 and to about 1.35, and even more preferably from about 1.15 to about 1.25. Moreover, the particle size distribution is preferably set such that the geometric standard deviation $\sigma_g$ preferably meets the criteria pursuant to the following Equation 1:

$$\sigma g \sim \frac{D90}{D50} \sim \frac{D50}{D10}$$

In other words, the D90/D50 particle size distributions and D50/D10 particle size distributions are preferably the same value or close to the same value, such as within about 10% of each other, and more preferably within about 5% of each other.

The formulated part material may then be filled into a cartridge or other suitable container for use with EP engine 12p in system 10. For example, the formulated part material may be supplied in a cartridge, which may be interchangeably connected to a hopper of development station 58. In this embodiment, the formulated part material may be filled into development station 58 for mixing with the carrier particles, which may be retained in development station 58. Development station 58 may also include standard toner development cartridge components, such as a housing, delivery mechanism, communication circuit, and the like.

Figure 5:
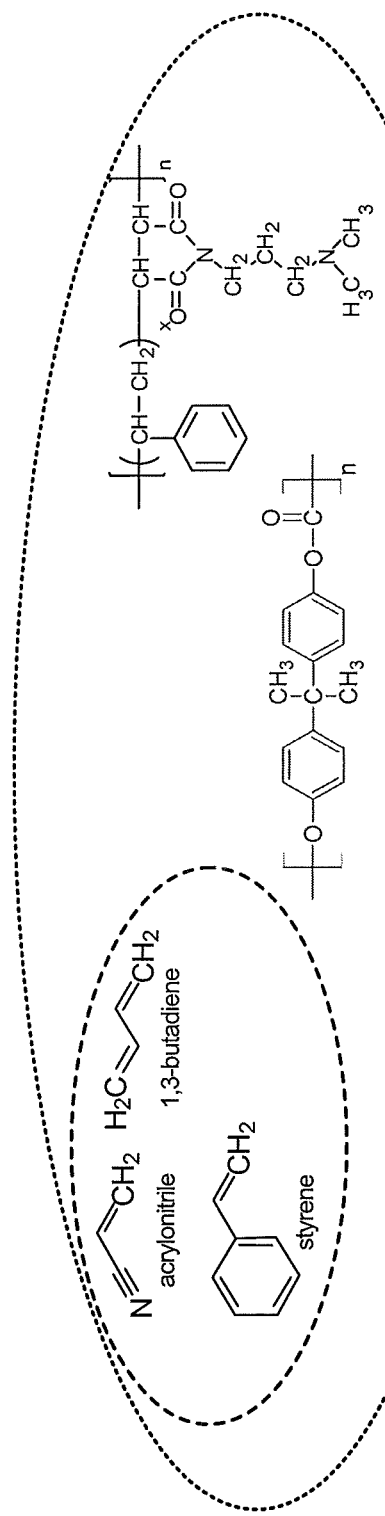
FIG. 5 is a chemical formula of ABS copolymer modified with polycarbonate and poly(styrene-co-maleimide).

Referring to FIG. 5, the ABS grafted copolymer modified with polycarbonate and poly(styrene-co-maleimide) is illustrated. The polymer is soluble in ethyl acetate and therefore can be synthesized by using an evaporative limited coalescence process. The evaporative limited coalescence process is useful in forming the copolymer due to its softness, as the polymer cannot be ground to the appropriate size and shape for use in an EP additive manufacturing system.

Figure 6:
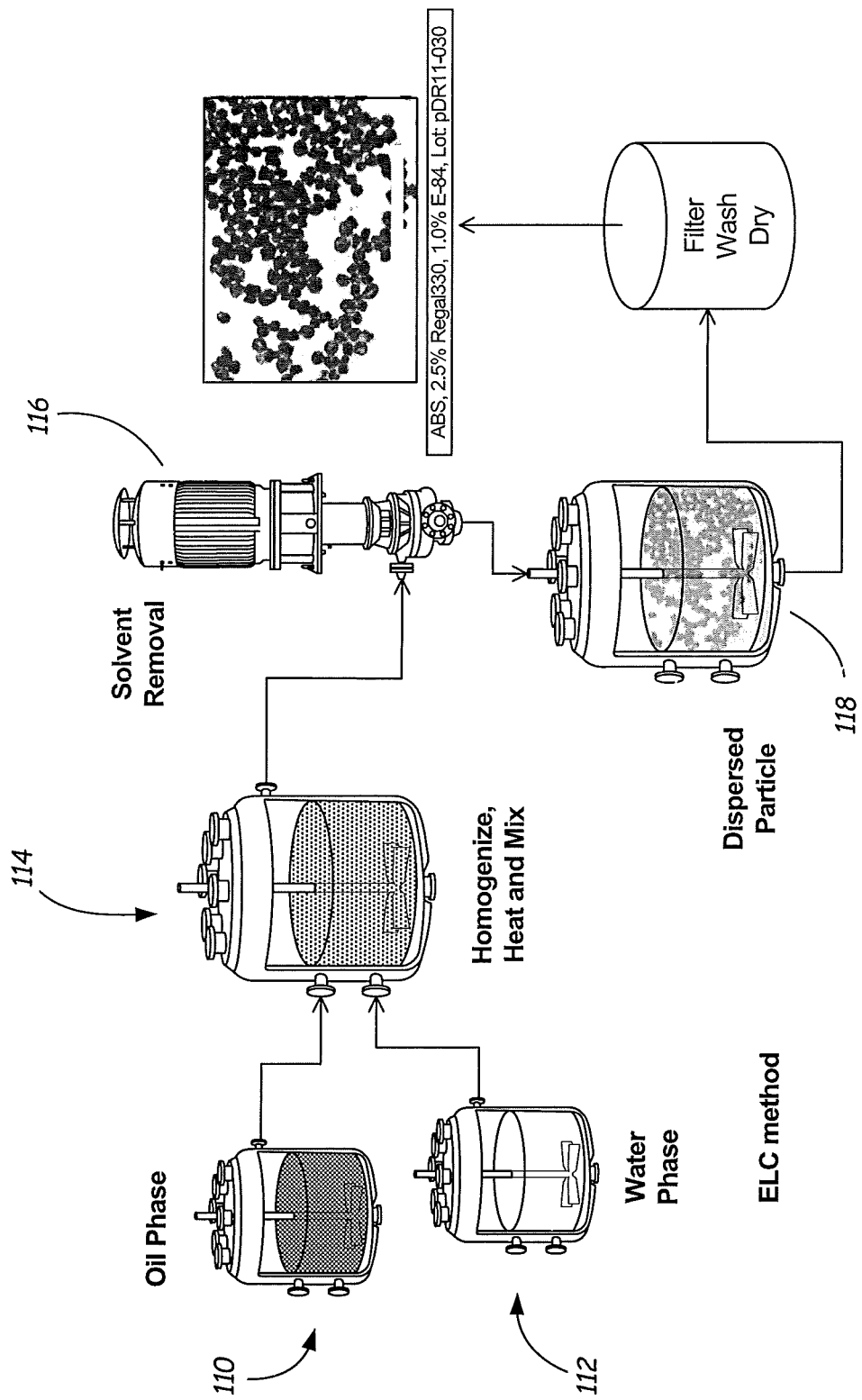
FIG. 6 is a schematic diagram of an evaporative limited coalescence process.

An exemplary evaporative limited coalescence process is illustrated in FIG. 6. The ABS grafted copolymer modified with polycarbonate and poly(styrene-co-maleimide) along with the 2-4% by weight of carbon black having the REGAL trade designation and sold by Cabot Corporation having a location in Boston, Mass. and 0.5-3% by weight of zinc t-butylsalicylate having the BONTRON trade designation manufactured by Orient Corporation located in Port Newark, N.J. were introduced into an oil phase tank 110 containing ethyl acetate and deionized water containing colloidal silica were added to a water phase tank 112.

A stream of ethyl acetate containing the copolymer and the deionized water containing colloidal silica were fed to a reactor 114 to form a dispersion. The dispersion is then mixed under high shear conditions with the aqueous medium described above to produce a suspension of submicron-sized droplets of the dispersion in the aqueous medium. The dispersion can optionally be heated.

After the dispersion is formed, the dispersion is transferred to an evaporator 116 where the solvent, ethyl acetate, is removed. While gentle agitation is employed in the evaporator 116, evaporation of the water immiscible organic carrier liquid, ethyl acetate, from the discontinuous aqueous phase is carried out. Any convenient condition can be employed for accomplishing evaporation, such as subjecting the suspension to sub-atmospheric pressures while stirring. Suitable sub-atmospheric pressures are in the range of about 100 to about 525 mm Hg.

Figure 7:
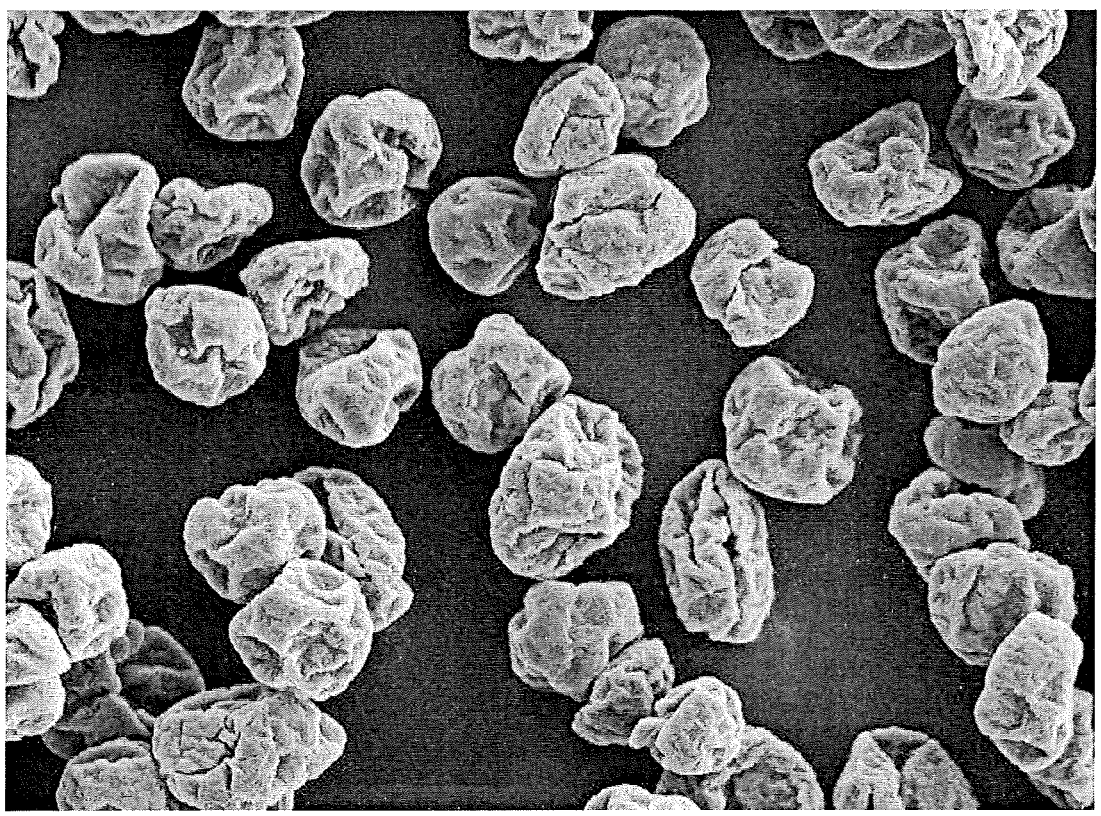
FIG. 7 is an electron microscope photograph ABS copolymer modified with polycarbonate and poly(styrene-co-maleimide) produced through the evaporative limited coalescence process.

After the ethyl acetate is removed, the deionized water containing the silica and the part material particles are transferred to another vessel 118 wherein the part material particles are separated from the silica particles. The part particles are transferred to another vessel 120 where the particles are washed, filtered and dried. The particles have a particle size distribution that can be used in an EP additive manufacturing system as illustrated in FIG. 7.

Figure 8:
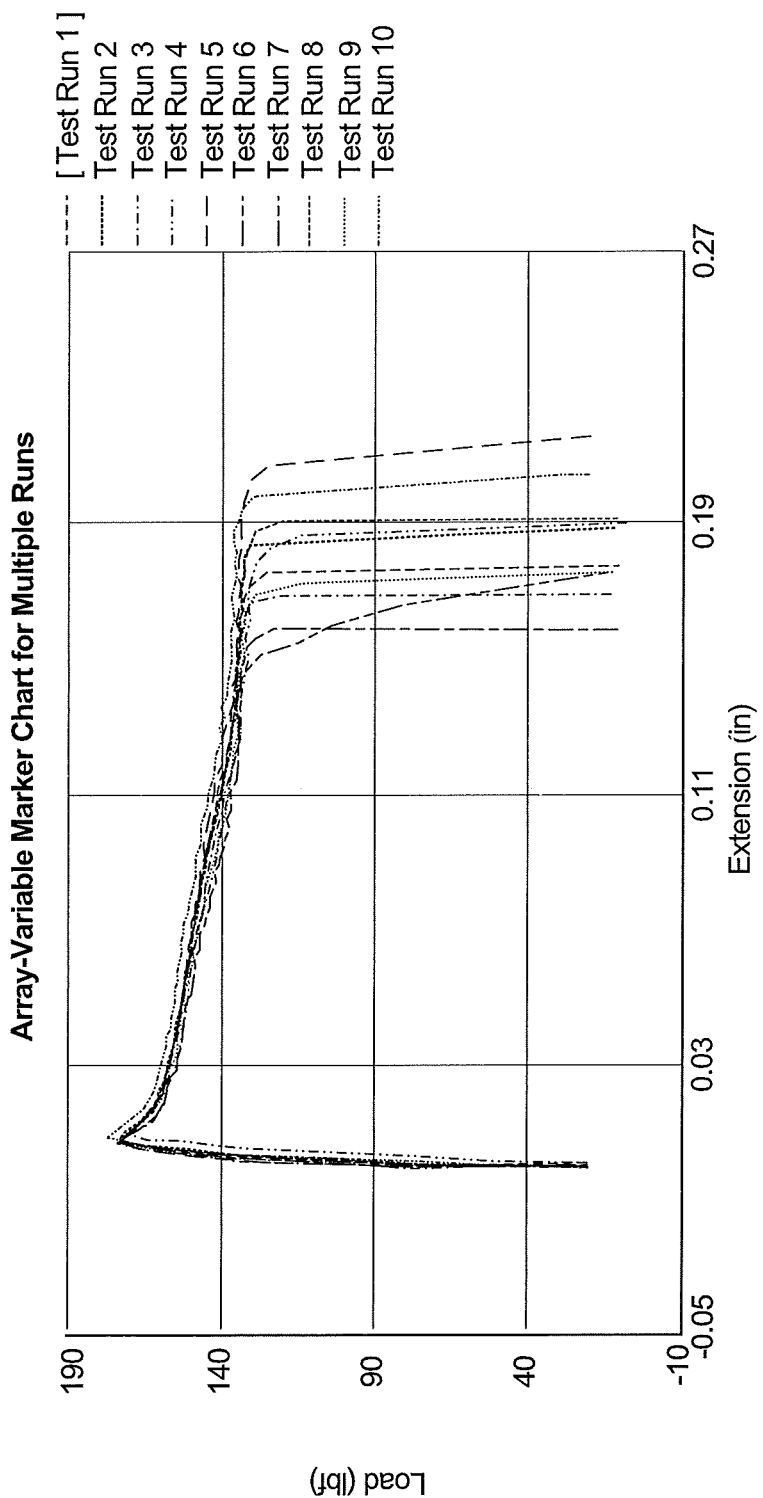
FIG. 8 is tensile testing results of ABS copolymer that is not modified with polycarbonate and poly(styrene-co-maleimide).

ABS part material is sufficient to print many parts. However, ABS part material has been found to lack in mechanical elongation at break properties required by some customers. The mechanical stress and strain for typical ABS part material are about 6,700 psi and 12%. Exemplary mechanical testing results for ABS part material using a Type V tensile tester manufactured by MTS Systems Corporation located in Eden Prairie, Minn. are illustrated in FIG. 8, where ten test runs were conducted and provided substantially similar results.

Figure 9:
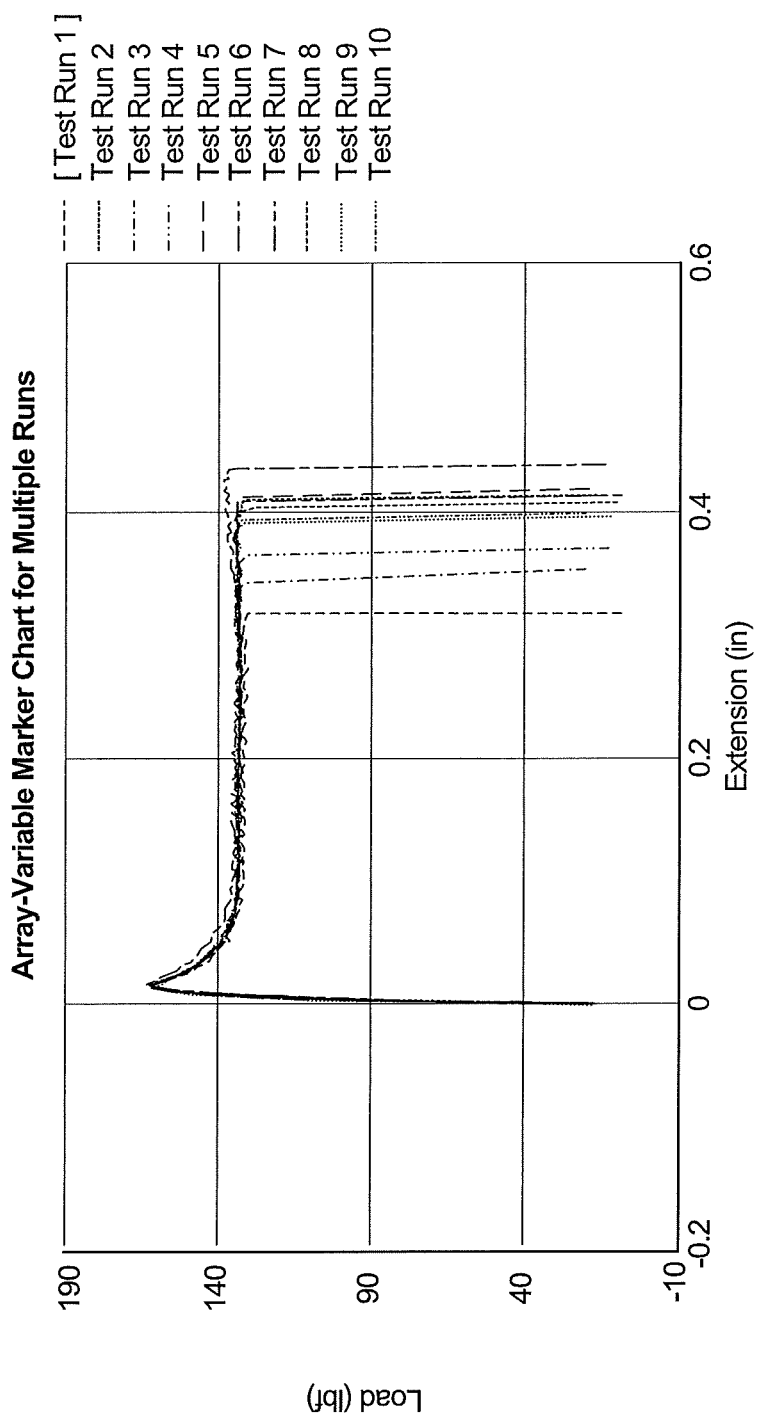
FIG. 9 is tensile testing results of ABS copolymer that is modified with polycarbonate and poly(styrene-co-maleimide).

However, when ABS copolymer is modified with polycarbonate and poly(styrene-co-maleimide), the resulting ABS grafted copolymer improved strain properties while maintain similar stress performance. Similar tests using the Type V tensile tester were conducted on the ABS grafted copolymer modified with polycarbonate and poly(styrene-co-maleimide), as illustrated in FIG. 9. A minimum improved stress performance of 55.8% was realized in the ABS grafted copolymer relative to ABS without polycarbonate and poly(styrene-co-maleimide).

Although the present disclosure has been described with reference to preferred embodiments, workers skilled in the art will recognize that changes may be made in form and detail without departing from the spirit and scope of the disclosure.

The invention claimed is:

1. A part material for printing three-dimensional parts with an electrophotography-based additive manufacturing system, the part material comprising:
    a composition comprising:
        a grafted polymer comprising acrylonitrile units, butadiene units, aromatic units, polycarbonate and poly(styrene-co-maleimide);
        a charge control agent; and
        a heat absorber;
    wherein the part material is provided in a powder form having a D50 particle size ranging from about 5 micrometers to about 30 micrometers; and
    wherein the part material is configured for use in the electrophotography-based additive manufacturing system having a layer transfusion assembly for printing the three-dimensional parts in a layer-by-layer manner.

2. The part material of claim 1, wherein the aromatic units comprise styrene units.

3. The part material of claim 2, wherein the polymer comprises an acrylonitrile-butadiene-styrene (ABS) grafted copolymer.

4. The part material of claim 1, wherein the D50 particle size ranges from about 10 micrometers to about 30 micrometers.

5. The part material of claim 1, wherein the powder form also has a D90/D50 particle size distribution and a D50/D10 particle size distribution each ranging from about 1.00 to about 1.40.

6. The part material of claim 1, wherein the charge control agent is selected from the group consisting of chromium di-t-butylsalicylic acids and oxy carboxylic acid complexes, zinc di-t-butylsalicylic acids and oxy carboxylic acid complexes, aluminum di-t-butylsalicylic acids and oxy carboxylic acid complexes, and mixtures thereof.

7. The part material of claim 1, wherein the charge control agent constitutes from about 0.1% by weight to about 5% by weight of the part material.

8. The part material of claim 1, wherein the heat absorber constitutes from about 0.05% by weight to about 10% by weight of the part material.

9. A part material for printing three-dimensional parts with an electrophotography-based additive manufacturing system, the part material comprising:
    a composition comprising:
        an acrylonitrile-butadiene-styrene (ABS) grafted copolymer modified with polycarbonate and poly(styrene-co-maleimide);
        a charge control agent constituting from about 0.1% by weight to about 5% by weight of the part material;
        an optional flow control agent constituting from about 0.1% by weight to about 10% by weight of the part material; and
        a heat absorber constituting from about 0.05% by weight to about 10% by weight of the part material;
    wherein the part material is provided in a powder form having a D50 particle size ranging from about 5 micrometers to about 30 micrometers, and D90/D50 particle size distribution and a D50/D10 particle size distribution each ranging from about 1.00 to about 1.40; and
    wherein the part material is configured for use in the electrophotography-based additive manufacturing system having a layer transfusion assembly for printing the three-dimensional parts in a layer-by-layer manner.

10. The part material of claim 9, wherein the part material is formulated, at least in part, with an evaporative limited coalescence process.

11. The part material of claim 10, wherein the D50 particle size ranges from about 10 micrometers to about 30 micrometers.

12. A method for printing a three-dimensional part with an electrophotography-based additive manufacturing system having an electrophotography engine, a transfer medium, and a layer transfusion assembly, the method comprising:
    providing a part material to the electrophotography-based additive manufacturing system, the part material compositionally comprising a charge control agent, a heat absorber, and a grafted copolymer having acrylonitrile units, butadiene units, aromatic units, polycarbonate and poly(styrene-co-maleimide) and has a powder form;
    triboelectrically charging the part material to a Q/M ratio having a negative charge or a positive charge, and a magnitude ranging from about −5 micro-Coulombs/gram to about −50 micro-Coulombs/gram;
    developing layers of the three-dimensional part from the charged part material with the electrophotography engine;

electrostatically attracting the developed layers from the electrophotography engine to the transfer medium;

moving the attracted layers to the layer transfusion assembly with the transfer medium; and transfusing the moved layers to previously-printed layers of the three-dimensional part with the layer transfusion assembly.

13. The method of claim 12, wherein the polymer comprises an acrylonitrile-butadiene-styrene (ABS) grafted copolymer modified with polycarbonate and poly(styrene-co-maleimide).

14. The method of claim 12, wherein the powder form of the part material has a D50 particle size ranging from about 5 micrometers to about 30 micrometers, and a D90/D50 particle size distribution and a D50/D10 particle size distribution each ranging from about 1.00 to about 1.40.

15. The method of claim 12, wherein the charge control agent constitutes from about 0.1% by weight to about 5% by weight of the part material, and wherein the heat absorber constitutes from about 0.5% by weight to about 10% by weight of the part material.

* * * * *